United States Patent

Gotoh

[11] Patent Number: 6,164,698
[45] Date of Patent: Dec. 26, 2000

[54] STEERING DEVICE FOR AUTOMOBILES

[75] Inventor: Hiroyuki Gotoh, Shizuoka-Ken, Japan

[73] Assignee: Suzuki Motor Corporation, Japan

[21] Appl. No.: 09/173,307

[22] Filed: Oct. 15, 1998

[30] Foreign Application Priority Data

Oct. 15, 1997 [JP] Japan .................................... 9-281847

[51] Int. Cl.⁷ ....................................................... B62D 1/00
[52] U.S. Cl. ............................ 280/771; 280/775; 74/492
[58] Field of Search ..................................... 280/773, 775, 280/777, 779, 771; 74/492, 493

[56] References Cited

U.S. PATENT DOCUMENTS

| | | | |
|---|---|---|---|
| 2,865,222 | 12/1958 | Bachman | 74/493 |
| 4,282,641 | 8/1981 | Phillips . | |
| 4,440,435 | 4/1984 | Norlin . | |
| 4,833,936 | 5/1989 | Mariani et al. | 280/775 |
| 4,946,195 | 8/1990 | Ioka et al. | 280/777 |
| 5,052,240 | 10/1991 | Miyoshi et al. | 74/493 |
| 5,082,078 | 1/1992 | Umeda et al. . | |
| 5,393,094 | 2/1995 | Wardavoir | 280/775 |
| 5,580,314 | 12/1996 | Moriyama et al. | 74/492 |
| 5,737,970 | 4/1998 | Asbrand et al. | 74/492 |
| 5,954,362 | 9/1999 | Aota et al. | 280/777 |
| 6,032,981 | 3/2000 | Imanishi et al. | 280/777 |

FOREIGN PATENT DOCUMENTS 338061 8/1991 Japan .
6107187 4/1994 Japan .

*Primary Examiner*—Daniel G. DePumpo
*Assistant Examiner*—Christopher Bottorff
*Attorney, Agent, or Firm*—Morrison Law Firm

[57] ABSTRACT

A steering device is mounted in a limited space in a small engine compartment, thereby providing improved efficiency for assembly on production lines and improved vehicle maintenance. A steering column extends upward diagonally from in front of an engine into a driver's cabin. When seen from above the vehicle, the steering column extends from the front of the engine to driver's cabin through a space formed between the engine and a side member of a chassis frame. A steering shaft and a middle shaft of the steering column are connected via a joint, which passes along the side of the engine. The joint has a pair of tightening bolt holes, and serrations. Both shafts also have serrations mating with the serrations on the joint. One of the bolts is loosely fitted into one of the bolt holes during installation. A flat cavity on one of the joining shafts receives the loosely fitted tightening bolt. The flat cavity permits limited in and out motion of the joint for setting the final position of the joint. The other of the joining shafts has an annular groove for receiving the other of the tightening bolts. The adjustability permitted by the flat groove enables prior installation of the joint on one of the shafts and later fitting of the joint to the second shaft. The positioning of the bolts permits installation and service from above the engine compartment.

2 Claims, 7 Drawing Sheets

STEERING DEVICE FOR AUTOMOBILES

BACKGROUND OF THE INVENTION

The present invention relates to an automobile steering device. In particular, the present invention relates to the structure of a steering device used in automobiles having parts such as: an engine mounted at a front section of a chassis frame formed by connecting a plurality of cross members to a left and a right side member; a steering mechanism for steering the front wheels; and a steering gear box, containing a steering gear, which is attached to a cross member and connected to the steering mechanism. More specifically, the present invention relates to a connecting structure between a steering shaft and a middle shaft in a steering column.

In automotive steering devices, the steering column includes a two-piece middle shaft as disclosed in Japanese Laid-Open Patent Publication Number 6-107187. In a typical embodiment, the steering column is disposed in an engine compartment. The lower middle shaft, one of the two pieces composing the middle shaft, is connected to a steering gear which is, in turn, connected to a steering device that steers the front wheels. A section of the middle shaft extends into a driver's cabin, which is partitioned from the engine compartment by a dash panel. The upper middle shaft is connected to the steering shaft in the driver's cabin. The upper and lower middle shafts are then connected in the driver's cabin by a joint.

The joint connecting the upper and lower middle shaft sections is tightened at the front end of the driver's cabin. A bolt is inserted into the bolt hole in this joint in a direction along the width axis of the vehicle. The bolt is then tightened to connect the two-part middle shaft.

In addition to an engine, the engine compartment of an automobile generally contains engine accessories such as radiators. A design preferably allows these accessories to be arranged in the small space above the chassis frame to minimize open space, thus providing a compact engine compartment space. A steering column is also disposed inside this engine compartment, for transferring an operating force from the driver to the steering mechanism used to steer the front wheels.

Thus, demand exists for a steering column appropriate for such a small, compact space. The connecting section of the steering column should be accessible from the engine compartment so that installation on production lines and automotive maintenance is made more efficient.

Another issue relating to ease of installation of the steering column relates to the bolt at the joint between the middle shaft and the steeling shaft. In production lines and repair shops, the bolt that tightens this joint must be manipulated from a standing position. Thus, the direction in which the bolt is inserted or tightened should be suitable for someone operating from above the engine compartment.

For similar reasons, it is desirable for the middle shaft to be installed without having to be rotated. This allows the bolt to be inserted roughly parallel to a flat section disposed on the middle shaft at a prescribed distance from the end of the middle shaft. The flat section extends in the direction of the shaft and allows the overall length of the steering column to be adjusted.

OBJECTS AND SUMMARY OF THE INVENTION

The object of the present invention is to overcome the problems of the conventional technology described above.

Briefly stated, the present invention provides a steering device for mounting in a limited space in a small engine compartment, thereby providing improved efficiency for assembly on production lines and improved vehicle maintenance. A steering column extends upward diagonally from in front of an engine into a driver's cabin. When seen from above the vehicle, the steering column extends from the front of the engine to driver's cabin through a space formed between the engine and a side member of a chassis frame. A steering shaft and a middle shaft of the steering column are connected via a joint, which passes along the side of the engine. The joint has apair of tightening bolt holes, and serrations. Both shafts also have serrations mating with the serrations on the joint. One of the bolts is loosely fitted into one of the bolt holes during installation. A flat cavity on one of the joining shafts receives the loosely fitted tightening bolt. The flat cavity permits limited in and out motion of the joint for setting the final position of the joint. The other of the joining shafts has an annular groove for receiving the other of the tightening bolts. The adjustability permitted by the flat groove enables prior installation of the joint on one of the shafts and later fitting of the joint to the second shaft. The positioning of the bolts permits installation and service from above the engine compartment.

According to an embodiment of the invention, there is provided an automotive steering device in a chassis-frame vehicle comprising: a steering mechanism for steering wheels, a steering gear box connected to a cross member in an engine compartment of the vehicle, the steering gear box including a steering gear connected to the steering mechanism, a steering column for transferring an operating force applied to a steering wheel to the steering gear, the steering column including a steering shaft connected to the steering wheel, a middle shaft in the steering column, connected to the steering,, shaft and the steering gear, the steering column extending rearward, upward at an angle, from forward in the engine compartment toward the steering wheel, through a space between an engine and a side member of the chassis frame, and a joint connecting the middle shaft and the steering shaft.

According to a feature of the invention, there is provided a steering column comprising: a steering shaft, an upper middle shaft, a lower middle shaft, a steering gear, ajoint for connecting the steering shaft to the upper middle shaft, a universal joint for connecting the upper middle shaft to the lower middle shaft, the joint including first and second bolt tightening holes therein, a flat cavity on one of the steering shaft and the upper middle shaft, a peripheral groove on the other of the steering shaft and the upper middle shaft, a first bolt through the first bolt tightening hole being alignable with the flat cavity on the one of and permitting limited motion of the joint along the flat cavity until further motion is restricted by the first bolt, a second bolt through the second bolt hole being alignable with the peripheral groove, whereby the other of is restricted from longitudinal motion, and engagement means on mating surfaces of the joint, the steering shaft and the middle shaft, the engagement means being of a type that prevents relative rotation of joined elements.

According to a further feature of the invention, there is provided a connection for a steering column comprising: a steering shaft connected at a first end to a steering wheel, a second shaft connected to a second end of the steering shaft, the second shaft being connected to a steering gear, a joint connecting the steering shaft to the second shaft, the steering shaft, the second shaft and the joint being disposed in an engine compartment of a vehicle, the joint including first and second clamping bolts, the first and second clamping bolts being positionable so that they are accessible from overhead of the engine compartment during installation and service of the vehicle, one of the steering shaft and the second shaft having a flat cavity on a surface thereof, the other of the steering shaft and the second shaft having an annular groove near an end thereof, one of the bolts fitting into the flat cavity, whereby longitudinal motion of the joint during installation, while the first and second bolts are loosely engaged, is enabled, and the other of the bolts fitting into the annular groove, whereby the joint holds the steering shaft and the second shaft together after the pair of bolts are tightened.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
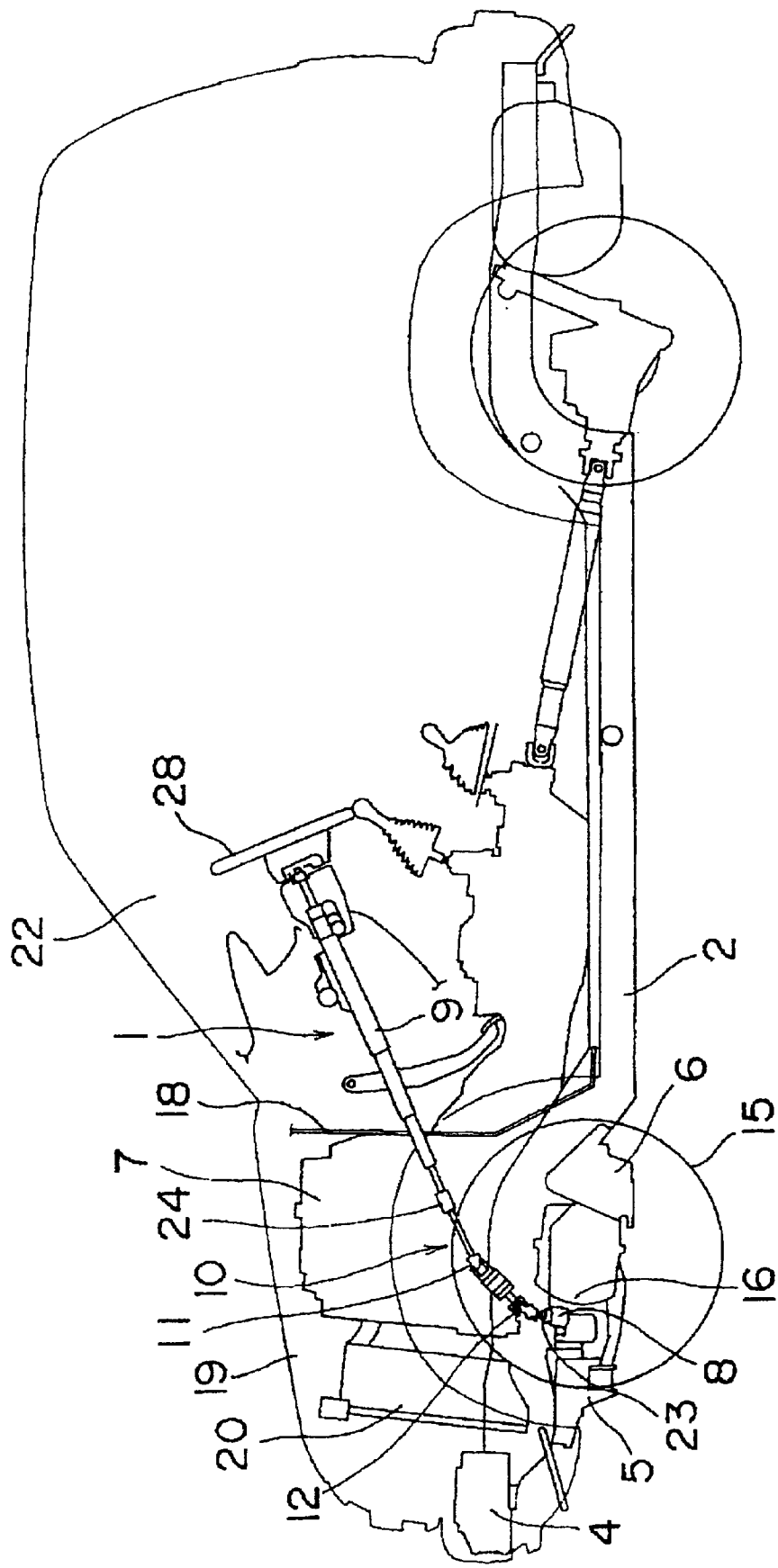
FIG. 1 is a side-view drawing of an automobile in which a steering device according to the present invention is mounted.
Figure 2:
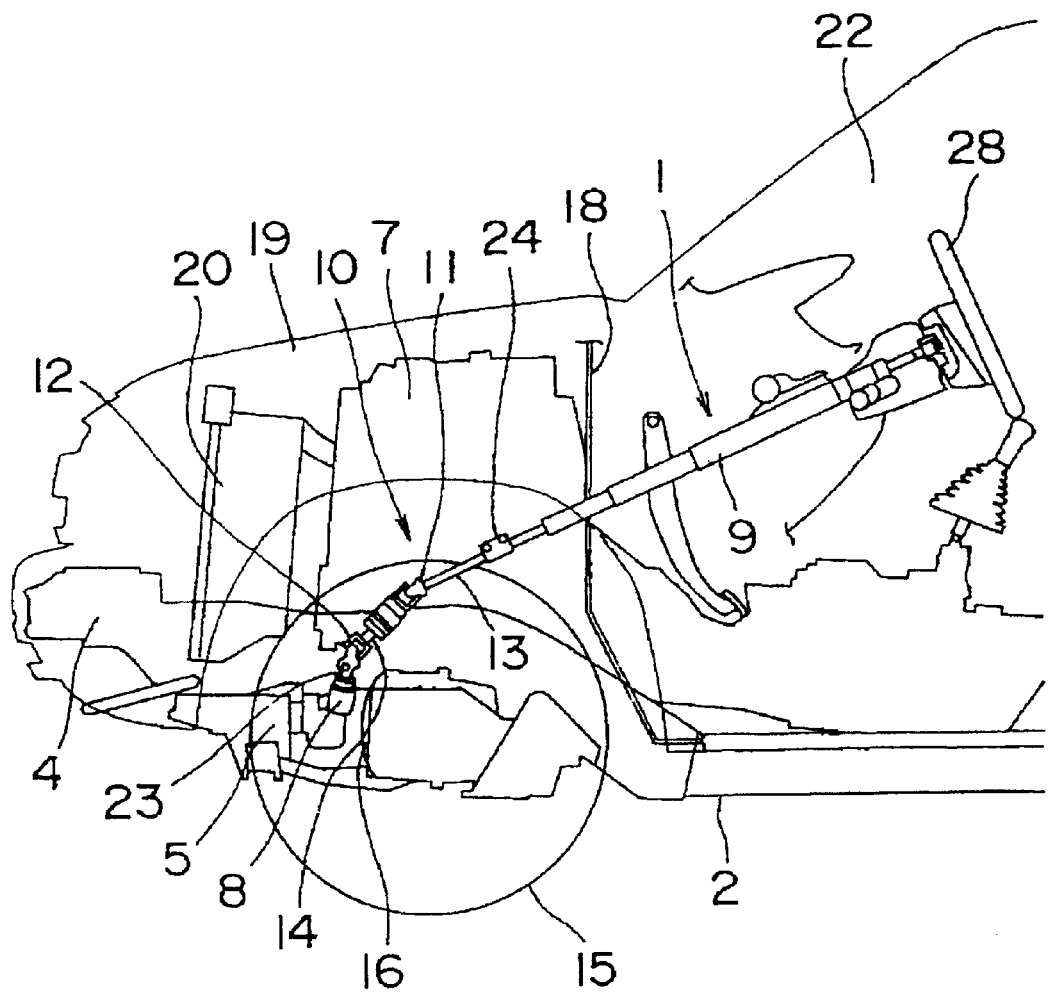
FIG. 2 is a side-view drawing showing the structures in the front section of FIG. 1.
Figure 3:
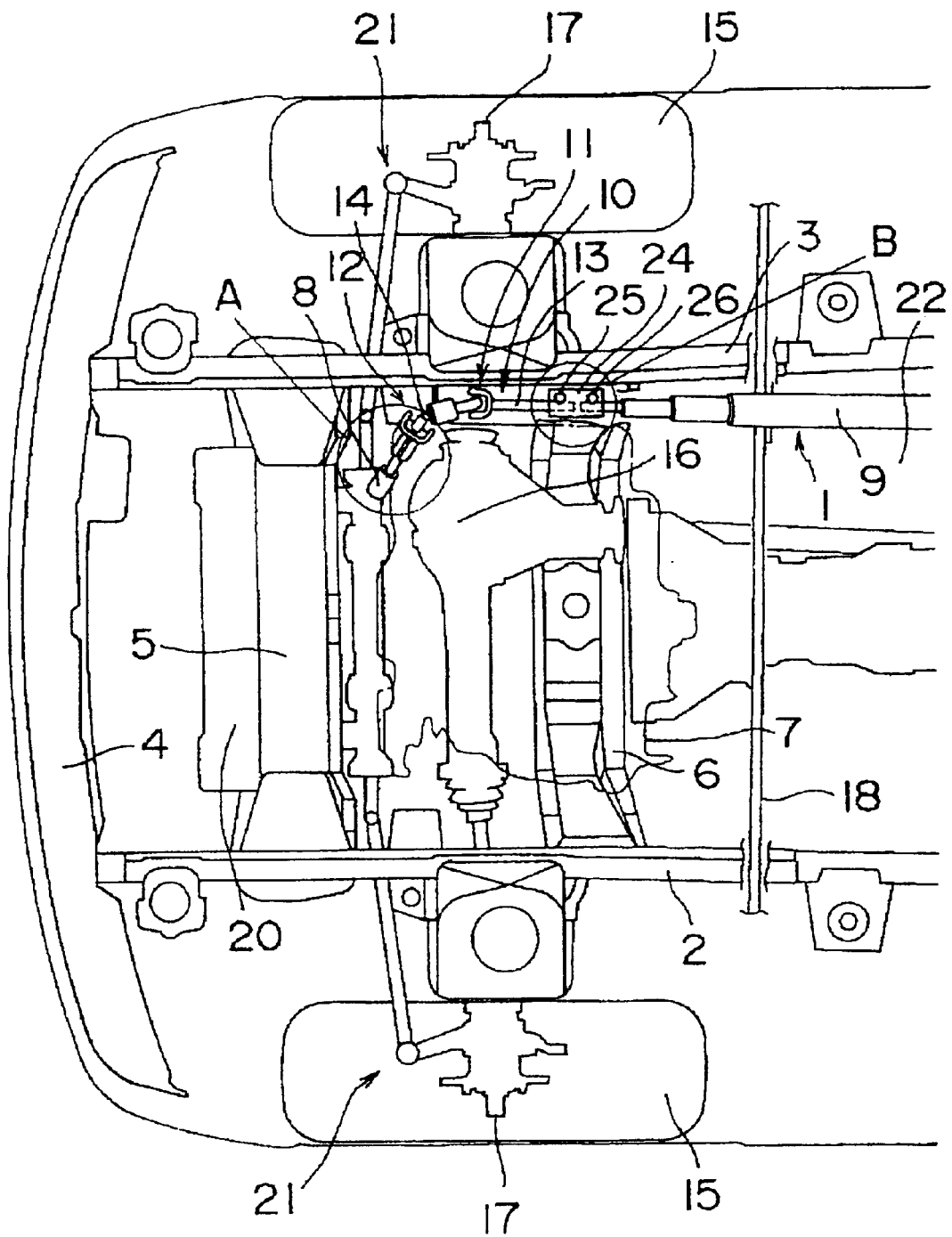
FIG. 3 is a plan drawing showing the structures below the engine in FIG. 2.

Referring to FIGS. 1–3, a steering device according to an embodiment of the present invention is mounted in an automobile. Engine accessories such as an engine 7 and a radiator 20 are disposed at the front section of the vehicle. A dash panel 18 separates the front section of the vehicle from the driver's cabin 22. The space in front of dash panel 18 is engine compartment 19; behind dash panel 18 is the driver's cabin 22. A steering column 1 extends from inside engine compartment 19 into driver's cabin 22. Viewed from the side of the vehicle, in FIG. 2, steering column 1 extends diagonally upward from the front of engine 7 in engine compartment 19 to driver's cabin 22. Viewed from the top of the vehicle, in FIG. 3, steering column 1 extends from the front of engine 7 into driver's cabin 22, passing through a space between engine 7 and a side member 3 of the chassis frame.

When a driver turns steering wheel 28, steering column 1 transfers the force to a steering shaft 9 and, via a middle shaft 10, to a steering gear 23. Steering gear 23 is disposed inside a steering gear box 8 and is attached via steering gear box 8 to a cross member 5.

Two cross members 4 and 5 connect side members 2 and 3 of the chassis frame ahead of front wheels 15. A cross member 6, disposed below engine 7 behind front wheels 15, also connects side members 2 and 3.

The following is a detailed description of the automotive parts inside engine compartment 19. Engine 7 is disposed between side members 2 and 3 of the chassis frame between front wheels 15. Radiator 20 is attached to cross member 5 in front of engine 7.

Steering shaft 9 extends diagonally downward toward the front of the vehicle along the inside of side member 3. One end of steering shaft 9 is connected to steering wheel 28 in driver's cabin 22. The other end is connected via ajoint 24 to middle shaft 10. Joint 24 is disposed in engine compartment 19 to the side of engine 7.

Middle shaft 10 contains first and second universal joints 11 and 12. Universal joints 11 and 12 are positioned so that second universal joint 12 is disposed along an imaginary extension of the input section of steering gear 23, and first universal joint 11 is disposed along an imaginary extension of steering shaft 9, which extends toward the front of the vehicle along the inside of side member 3.

The following is a description of the automotive parts below engine 7. Steering gear box 8 connects steering gear 23 to a steering mechanism 21 which steers front wheels 15. Steering gear box 8 is attached to the rear of cross member 5, which also supports radiator 20. Cross member 4 is disposed in front of cross member 5. Radiator 20 is disposed in front of cross member 5 on the opposite side from steering gear box 8. A fixed distance is maintained between radiator 20 and steering gear box 8.

A differential gear case 16 is disposed behind steering gear box 8 and approximately below engine 7.

Figure 4:
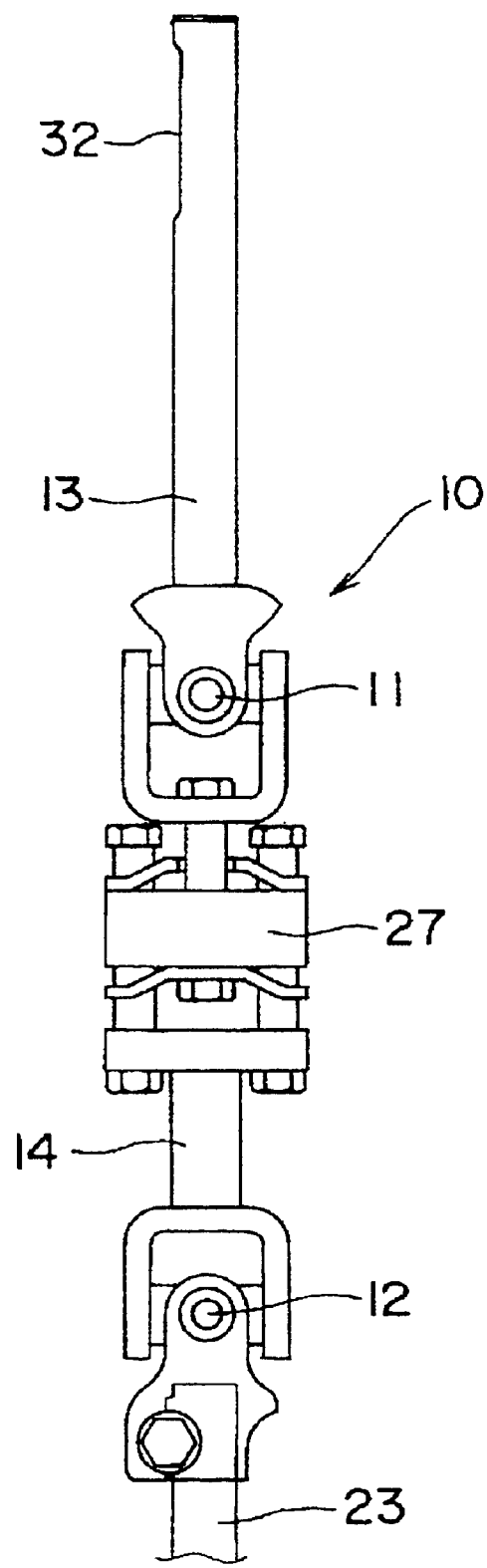
FIG. 4 is a drawing of a middle shaft.

Referring to FIG. 4, the following describes middle shaft 10 in detail. Middle shaft 10 is a two-part structure formed from lower middle shaft 14 and upper middle shaft 13, connected via universal joint 11. Upper riddle shaft 13 is connected to steering shaft 9 in engine compartment 19. Also in the engine compartment, lower middle shaft 14 is connected to steering gear 23 via a universal joint 12. Preferably, a damper 27 is disposed on lower middle shaft 14 to absorb vibration. Damper 27 prevents vehicle vibration from being transferred to the driver through steering shaft 9 and steering wheel 28.

Figure 5:
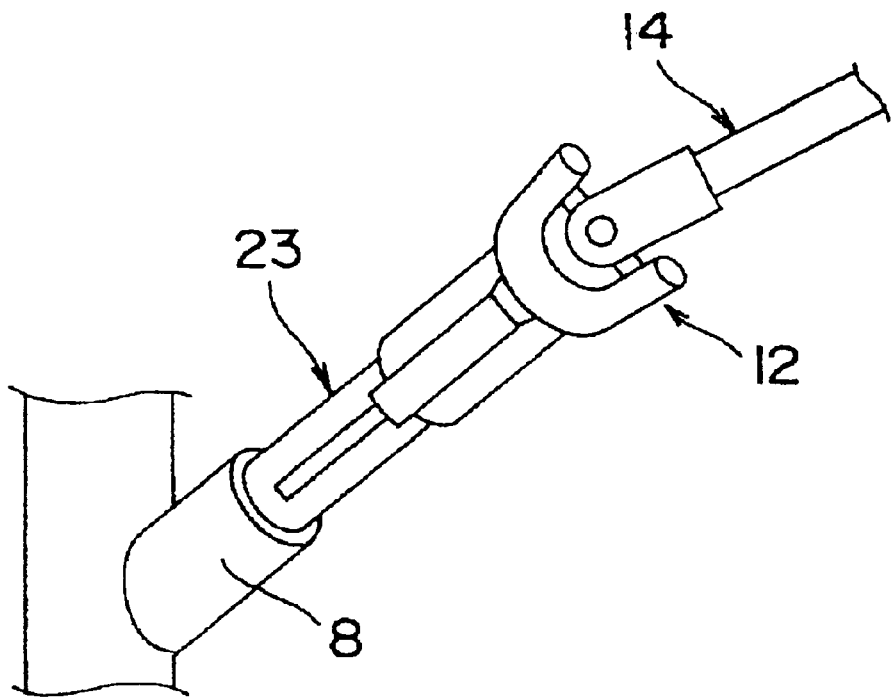
FIG. 5 is a detailed drawing showing the content of the area marked as A in FIG. 3.
Figure 6:
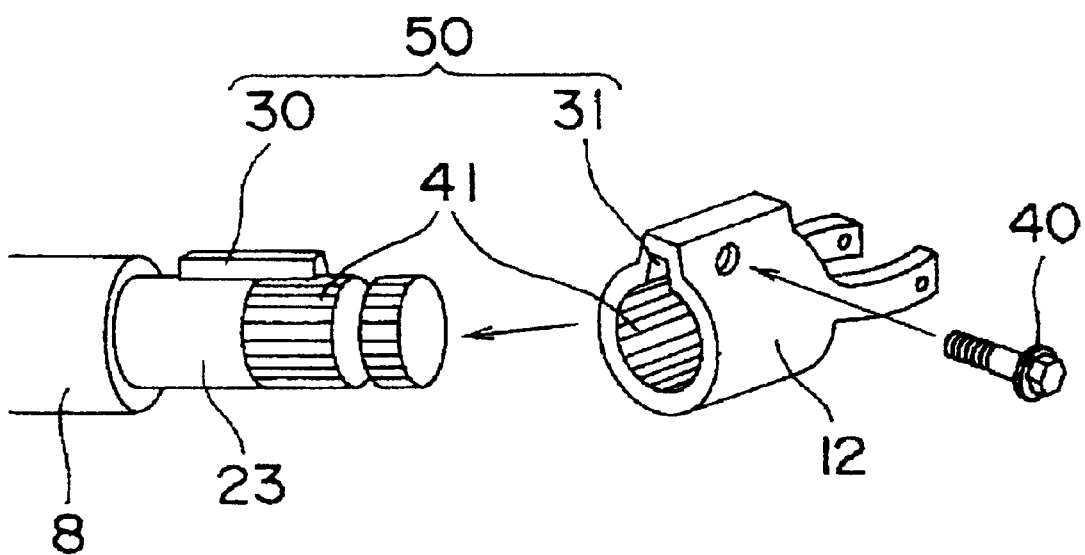
FIG. 6 is a drawing showing the details of the engagement between an input section of a steering gear from FIG. 5 and a universal joint of a lower middle shaft.

FIGS. 5 and 6, show how lower middle shaft 14 and steering gear 23 fit together, as well as details of an engagement section 50 disposed on the fitting section. The two parts are connected by inserting universal joint 12 of lower middle shaft 14 into the input section of steering gear 23, and tightening the two together using a bolt 40. An engagement section 50 at this fitting section allows rotational positioning of the input section of steering gear 23. Engagement section 50 is made up of an engagement projection 30 on steering gear 23 and an engagement cavity 31 on universal joint 12. It is possible to reverse engagement projection 30 and engagement cavity 31, by setting engagement projection 30 on universal joint 12 and engagement cavity 31 on steering gear 23. In this embodiment, universal joint 12 prevents rotation of the input section of the steering gear via serrations 41 as well.

Figure 6A:
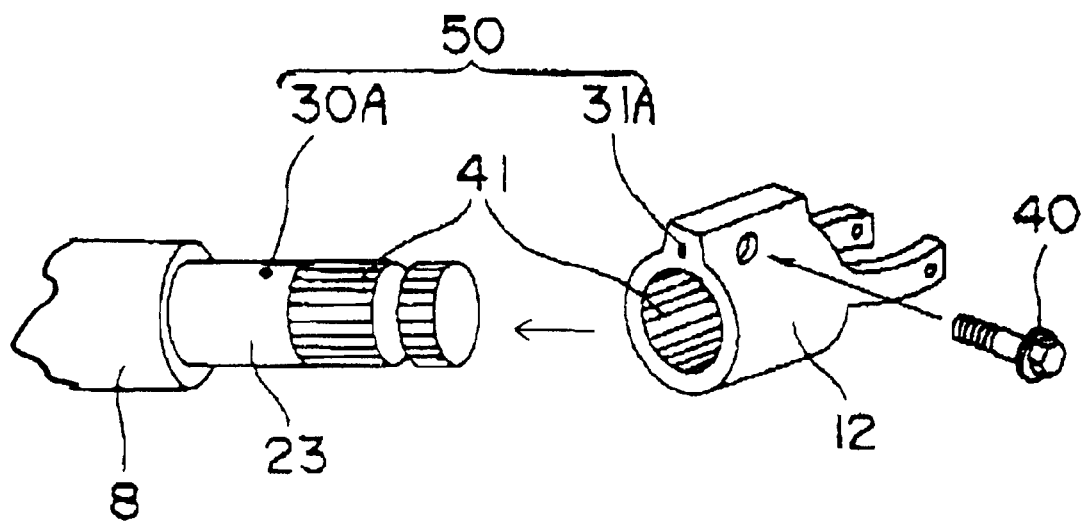
FIG. 6A is a drawing showing the details of another type of engagement between an input section of a steering gear and a universal joint of a lower middle shaft.

Referring now to FIG. 6A, a further embodiment shows an engagement section 50 in which rotational positioning during engagement is guided by a fitting mark 30A on steering gear 23, and a fitting mark 30B on universal joint 2. When fitting steering gear 23 and universal joint 12 together, fitting marked 30A and 30B are aligned, and then the parts are mated by engaging serrations 41 of these elements.

Figure 7:
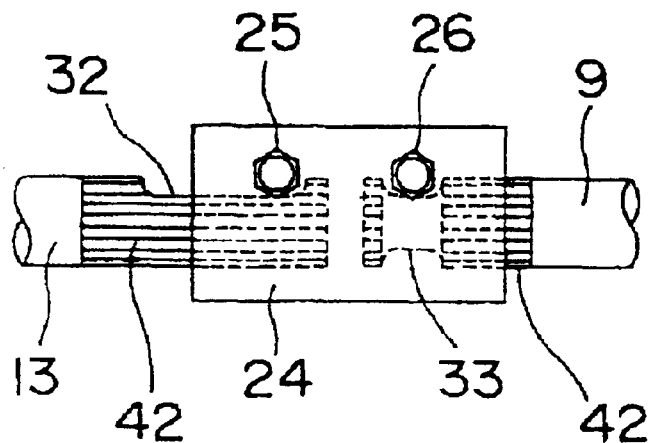
FIG. 7 is a detailed drawing showing the content of the area marked as B in FIG. 3.

FIG. 7, shows in detail the connection between upper middle shaft 13 and steering shaft 9. In this connecting section, joint 24 accepts and supports both upper middle shaft 13 and steering shaft 9. The connection uses two bolts 25 and 26.

Steering gear 23 is connected to lower middle shaft 14 and rotates in synchronization. Upper middle shaft 13 rotates together with lower middle shaft 14. A flat cavity 32, pointed upward and extending along the direction of upper middle shaft 13, is formed by cutting away a section of upper middle shaft 13 at a prescribed distance away from the end of upper middle shaft 13. When upper middle shaft 13 rotates, flat cavity 32 rotates as well. From this arrangement, upper middle shaft 13 and steering shaft 9 are connected via a bolt 25 inserted into joint 24, which has a bolt tightening hole flat pointing upward. Joint 24 is tightened by passing bolt 25 through joint 24 over the surface of flat cavity 32 of upper middle shaft 13.

The side surface of the screw portion of bolt 25 contacts the flat surface of flat cavity 32. Rotation is transferred between upper middle shaft 13 and joint 24 via bolt 25, and serrations 42.

In a preliminarily connected state, when bolt 25 is loosely attached, bolt 25 is free to slide up and down along the axis of upper middle shaft 13 with bolt 25 moving over the flat surface of flat cavity 32 of upper middle shaft 13. Thus, joint 24 is free slide over upper middle shaft 13 within the limits of flat cavity 32.

In this embodiment, serrations 42 also restrict upper middle shaft 13 from rotating with steering shaft 9.

Figure 8:
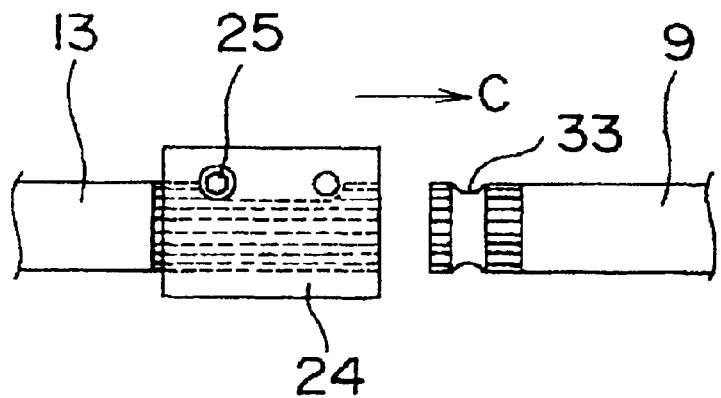
FIG. 8 is a drawing showing an upper middle shaft and a joint loosely connected.

FIG. 8 shows specifically how upper middle shaft 13 and steering shaft 9 are assembled. First, bolt 25 is attached loosely so that joint 24 and upper middle shaft 13 are loosely connected, but joint 24 is prevented from coming off upper middle shaft 13. This permits preassembly of joint 24 onto upper middle shaft 13. Then, when it is time to complete the connection, joint 24 is slid along the direction indicated by arrow C toward steering shaft 9 until joint 9 is fitted onto steering shaft 9 with the upper bolt hole aligned with groove 33. Bolt 26 is then inserted and bolt 26 is tightened to complete the connection. When connecting upper middle shaft 13 and steering shaft 9, joint 24 is able to slide along upper middle shaft 13. Consequently, there is some freedom where to tighten joint 24. Thus, the overall length of steering column 1 can be adjusted to accommodate normal manufacturing tolerances.

A groove 33 is cut around the circumference in steering shaft 9 at the end toward the middle shaft. When bolt 26 is attached to joint 24, bolt 26 and groove 33 engage so that joint 24 cannot be pulled from steering shaft 9.

Figure 9:
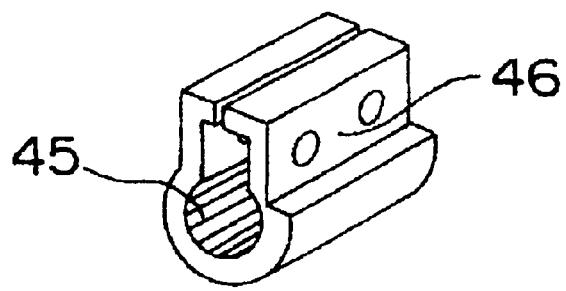
FIG. 9 is a perspective drawing showing the joint.

FIG. 9 shows the overall shape of joint 24. Serrations 45 are formed along the inside of joint 24 to engage with serrations 42 of steering shaft 9 and upper middle shaft 13. A seating surface 46 is disposed on a section of the outer surface for bolts 25 and 26, which are used to tighten upper middle shaft 13 and steering shaft 9.

In general, engine compartments must be designed efficiently so that the engine and engine accessories such as radiators can be placed compactly in the small space above the chassis frame. The present implementation provides a steering column and a steering device appropriate for this type of small space.

The connections for the steering column can all be performed inside the engine compartment. Thus, production-line assembly and automotive maintenance are made more efficient.

In installing this steering column, one significant element is the direction in which the bolt is tightened in the joint connecting the middle shaft and the steering shaft. On a production line or in a repair shop, the bolt used to tighten this joint is manipulated standing up. With the present invention, the insertion of the bolt into the joint and the tightening of the bolt is performed from above the engine compartment, thus allowing the work to be performed more efficiently.

Furthermore, in this joint, a flat section is disposed at a prescribed distance from the end of the middle shaft and extended along the shaft. This flat section is roughly parallel to the direction in which the bolt is inserted. Thus, the middle shaft can be adjusted up and down to fit without rotation, and work is performed more efficiently.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automotive steering device in a chassis-frame vehicle comprising:

a steering mechanism for steering wheels;

a steering gear box rigidly connected in an engine compartment of said vehicle;

said steering gear box being disposed forward of an engine in said engine compartment;

said steering gear box including a steering gear connected to said steering mechanism;

a steering column for transferring an operating force applied to a steering wheel to said steering gear;

said steering column including a steering shaft connected to said steering wheel;

a middle shaft in said steering column, connected to said steering shaft and said steering gear;

said steering column extending rearward, upward at an angle, from forward in said engine compartment toward said steering wheel, through a space between an engine and a side member of said chassis frame;

said steering shaft being transversely misaligned with said steering gear box, with said steering gear box being disposed substantially more centrally of said chassis-frame than said steering shaft a first universal joint connecting said middle shaft and said steering shaft;

a second universal joint connecting said middle shaft and said steering gear box;

said middle shaft being transversely inclined to apply steering torque from said steering shaft to said steering gear box while avoiding mechanical interference with said engine.

2. An automotive steering device according to claim 1, further comprising:

said steering shaft including a joint therein;

said joint including a sleeve;

a lower end of said steering shaft being inserted into a first end of said sleeve;

an upper end of said middle shaft being inserted into a second end of said sleeve;

said sleeve including first and second bolt holes for receiving first and second clamping bolts therein;

said first and second clamping bolts being positionable so that they are accessible from overhead of said engine compartment;

one of said steering shaft and said middle shaft having a flat cavity on a surface thereof;

the other of said steering shaft and said midddle shaft having an annular groove near an end thereof;

one of said clamping bolts fitting into said flat cavity, thereby permitting longitudinal motion of said joint during installation, while said first and second bolts are loosely engaged;

the other of said bolts fitting into said annular groove, thereby limiting longitudinal motion of said sleeve with respect to said annular groove; and said joint holding said steering shaft and said middle shaft together after said first and second clamping bolts are tightened.

* * * * *